May 22, 1928.
C. R. RAMSDEN
1,670,823
THERMOSTATICALLY CONTROLLED IGNITION CUT-OUT FOR LUBRICATING SYSTEMS
Filed June 15, 1926
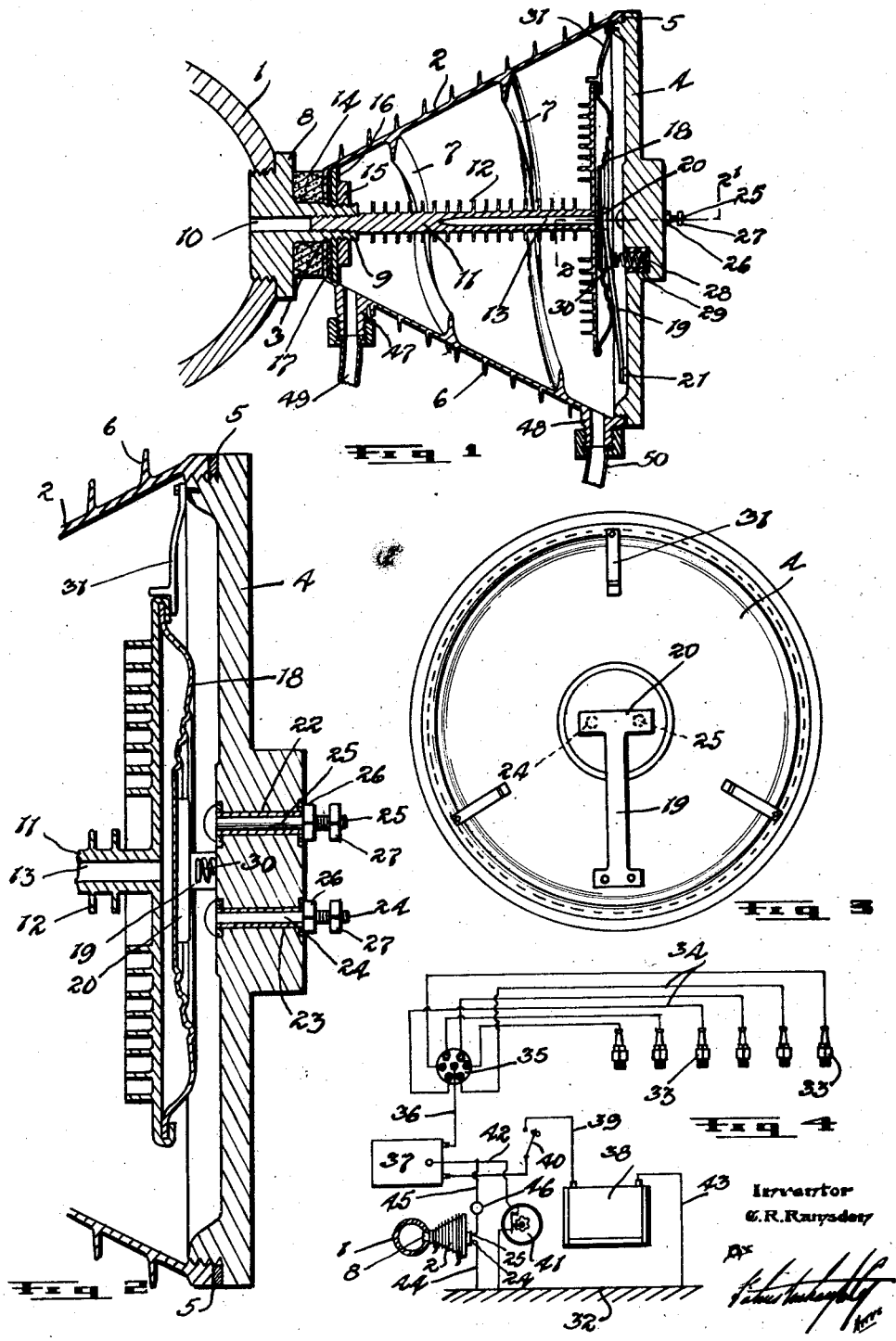

Patented May 22, 1928.

1,670,823

UNITED STATES PATENT OFFICE.

CHARLES ROGER RAMSDEN, OF BRANDON, MANITOBA, CANADA.

THERMOSTATICALLY-CONTROLLED IGNITION CUT-OUT FOR LUBRICATING SYSTEMS.

Application filed June 15, 1926. Serial No. 116,231.

The invention relates to improvements in thermostatically controlled ignition cut outs for lubricating systems and particularly adapted for use on automobile or such like lubricating systems and an object of the invention is to provide a device which will automatically short circuit the ignition circuit of the engine when the lubricating oil is not circulating in sufficient quantity to properly lubricate the engine.

A further object of the invention is to construct a device such that the circuit is grounded by the action of a thermostat operating under the influence of temperature changes.

A further object is to construct the appliance in a simple, durable and inexpensive manner, so that it can be readily installed on the various existing types of automobiles and such that the various parts can be readily demounted for inspection or repair purposes.

With the above more important and other minor objects in view which will become more apparent as the description proceeds, the invention consists essentially in the arrangement and construction of parts hereinafter more particularly described, reference being had to the accompanying drawing, in which:—

Fig. 1 is a vertical longitudinal sectional view centrally through the device as it appears installed on the existing manifold.

Fig. 2 is an enlarged detailed horizontal sectional view at 2—2' Figure 1.

Fig. 3 is an interior view of the cap.

Fig. 4 is a view showing diagrammatically the customary ignition circuit of an automobile and the manner in which my device is installed.

In the drawing like characters of reference indicate corresponding parts in the several figures.

The exhaust manifold 1 is utilized as a source of heat and to it I attach in a manner shortly described, the cup or container 2 through which oil is free to circulate. The container is herein shown as frusto-conical in shape and has the small end thereof closed save for a relatively small aperture 3 reserved therein and the large end thereof internally screw threaded to receive the closure cap 4, there being a gasket or washer 5 inserted between the cap and the casing to prevent leakage. The cup is preferably also provided on the outer side with heat radiating fins 6 and interiorly with spiralling ribs 7 which latter have a natural tendency to feed the oil towards the large end of the container.

A screw plug 8 is screw threaded into the manifold as best shown in Figure 1 and is provided with an extending exteriorly screw threaded nipple 9 which passes through the aperture 3. A central hole or duct 10 passes through the plug and nipple and has the outer end thereof interiorly screw threaded to receive the screw threaded end of an extending stem 11. The stem is provided also with heat radiating fins 12 and has the end towards the cap fitted with a centrally disposed lengthwise extending bore or hole 13, the length of which is approximately equal to half the length of the stem.

A comparatively thick asbestos or other such heat insulator 14 is placed between the small end of the casing and the plug and the cup is held in place by a nut 15 screw threading on the nipple 9 and engaging a washer 16 beyond which I place an insulating washer 17 in contact with the interior face of the cup. Obviously when the small end of the cup is tightened up, the cup is firmly fastened to the cap. By inserting the insulators, I reduce to a minimum the amount of heat radiated to the cup from the plug.

The outer end of the stem carries a diaphragm 18 of any approved type, the interior of the diaphragm containing an oil such as oil of turpentine, the flashing point of which is approximately 313 degrees F. The interior of the diaphragm is in direct communication with the hole 13 and the expansible side of the diaphragm is engaged by a spring 19 permanently secured to the cap and having a T-shaped free end 20. An insulating block 21 insulates the fixed end of the spring.

The cap carries two insulating tubes 22 and 23 through which I pass two binding posts 24 and 25, these having their inner ends terminating in exposed heads positioned directly opposite the T-head 20 of the spring and their outer ends supplied with jam nuts 26 and 27. The cap is supplied with an interior pocket 28 containing an insulating socket 29 in which I seat a coil spring 30 which engages the spring arm 19 and holds it normally against the diaphragm. The diaphragm is adapted, upon the oil of turpentine therein expanding a sufficient amount, to bring the bar 20 into contact with the exposed inner ends of the binding posts 24 and 25 and the electrical connecting of these binding posts in this manner is utilized to short circuit the ignition circuit of the automobile, or such like engine.

In order to steady the diaphragm, I have provided the cap with a number of similar arms 31 which have their inner ends engaging the rim of the diaphragm in order to centre and prevent vibration thereof.

I will now refer to Figure 4 where I have shown diagramatically the conventional ignition circuit of an automobile engine, the ground or automobile frame being indicated at 32. The spark plugs 33 of the engine cylinders are connected by the usual wires 34 to the distributor 35 and the distributor is connected by the wire 36 to the secondary terminal of the ignition coil box 37. The battery 38 is connected by the wire 39 to the primary terminal of the ignition coil box, there being a switch 40 introduced to control the passage of the current, this switch being usually located on the dash of the automobile. The customary contact breaker is indicated at 41 and a ground wire 42 connects the ignition coil box to the circuit breaker. A ground wire 43 connects the one side of the battery to the frame or ground 32.

I have not given a detailed description of the ignition circuit as such is well understood by those familiar with the art. My device is designed to short circuit the ignition circuit when there is not sufficient lubricating oil circulating and by so doing prevent any sparks at the plugs and consequently stop the engine running.

When the device is installed, the terminal 24 is grounded by the wire 44 and the terminal 25 is connected to the ground wire 42 by a wire 45. I have also shown an electric light 46 introduced in the wire 45 and in actual practice this light will be on the dash and will act as a pilot light and it will become illuminated coincident with the short circuiting of the ignition circuit as brought about by my device.

The cup or casing 2 is provided on the under side with a comparatively short inlet pipe 47 and with a comparatively short outlet pipe 48 and to the pipe 47 I connect an oil pipe 49 and to the pipe 48 an oil pipe 50. The pipe 49 is connected to the pump side of the lubricating system of the engine and that 50 to any part of the oiling system which will return the oil discharging there through to the crank case of the engine. The oil pipe 49 is adapted to deliver oil from the lubricating system into the cup and the pipe 50 is adapted to direct the oil from the cup back into the crank case, the arrangement being such that when oil is flowing in the lubricating system, there will be oil passing through the cup.

In order to better understand my invention I will now describe the manner in which it operates. Assuming the engine is running, the comparatively high temperature developed in the exhaust pipe 1 will cause the heating of the plug 8 and through the plug 8 by convection the heating of the stem 12 with the result that the oil in the thermostat will be heated. At the same time, however, the lubricating oil, which is considered for the time being as circulating through the cup, coming in the pipe 49 and going out that 50, is acting to cool the stem and diaphragm as the temperature of the circulating oil is considerably below the temperature of the exhaust. The circulating oil and the exhaust are accordingly operating to maintain under efficient operating conditions a resultant temperature below that of the flashing point of the oil of turpentine within the diaphragm and when such temperature is preserved, the diaphragm is not expanded to a condition such that the contact 20 connects the binding posts 24 and 25.

It will be observed, however, should there be an insufficient quantity of oil circulating for proper lubricating conditions or should there be no oil circulating that the temperature of the stem will quickly rise with the result that the temperature of the oil in the diaphragm is brought to such a height that the diaphragm expands sufficiently to cause the head 20 to contact with the posts 24 and 25. Immediately this occurs, the primary side of the ignition circuit is short circuited through the wires 44 and 45 and the light is illuminated.

The short circuiting so occasioned will obviously stop any spark occurring at the spark plugs and the engine will stop running. With the device installed, one has accordingly a safety appliance which will automatically operate to stop the engine when insufficient or no oil is circulating in the oil lubricating system. Whilst the pilot light is not necessary to the operation, it is desirable as it gives a visible indication to the driver that his engine stopped due to insufficient oil in the lubricating system.

What I claim as my invention is:—

1. A thermostatically controlled ignition cut out for the lubricating system of an internal combustion engine comprising a thermostatic appliance subjected to the heat of the exhaust and the heat of the circulating lubricating oil and adapted upon expanding under a predetermined resultant temperature, to short circuit the ignition circuit.

2. A thermostatically controlled ignition cut out for the lubricating system of an internal combustion engine comprising a thermostatic appliance subjected to the heat of the exhaust and the heat of the circulating lubricating oil and a switch member introduced in the ignition circuit and engaged by the thermostatically operated member, said latter member being adapted to close the switch member and short circuit the ignition circuit upon a predetermined resultant temperature being reached.

3. A thermostatically controlled ignition cut out for the lubricating system of an internal combustion engine comprising a diaphragm subjected to the combined action of the heat of the exhaust and the heat of the circulating lubricating oil, a normally open grounding switch introduced in the ignition circuit and adapted to be engaged and closed by the diaphragm upon the oil failing to circulate and the diaphragm being subjected to the heat of the exhaust only.

4. A thermostatically controlled ignition cut out for the lubricating system of an internal combustion engine comprising a diaphragm subjected to the temperature of the engine exhaust and to the temperature of the circulating oil, a normally open grounding switch contained in the ignition circuit and opposing the diaphragm, said grounding switch being adapted to be closed by the diaphragm upon the resultant temperature developed reaching a predetermined high point, such increase of temperature being brought about by the lubricating oil failing to circulate sufficiently for efficient lubrication of the engine.

5. In a thermostatically controlled ignition cut out for the lubricating systems of internal combustion engines, the combination with the exhaust manifold, the ignition circuit and the lubricating system, of an oil container through which oil from the lubricating system is adapted to flow, a diaphragm within the container and mounted such that the diaphragm is subjected to the heat of the exhaust by conduction and to the heat of the lubricating oil and a normally open grounding switch introduced in the ignition circuit and opposing the diaphragm, said grounding switch being adapted to be closed by the expansion of the diaphragm upon the oil failing to circulate through the casing 6. In a thermostatically controlled ignition cut out for the lubricating systems of internal combustion engines, the combination with the exhaust manifold, the ignition circuit and the lubricating system, of a casing attached to the exhaust manifold and through which lubricating oil under normal conditions is circulating, a stem extending into the casing and adapted to be heated by conduction by the exhaust, an expansible diaphragm carried by the stem and normally in contact with the circulating oil and containing an expansible liquid subjected by conduction to the heat of the manifold and of the circulating oil, a normally open grounding switch contained in the ignition circuit and opposing the diaphragm, said switch being adapted to be closed by the expanded diaphragm upon an abnormal reduction in the flow of oil circulating through the casing.

7. In a thermostatically controlled ignition cut out for the lubricating systems of internal combustion engines, the combination with the exhaust manifold, the ignition circuit and the lubricating system, of a casing attached to the exhaust manifold and through which lubricating oil under normal conditions is circulating, a stem extending into the casing and adapted to be heated by conduction by the exhaust, an expansible diaphragm carried by the stem and normally in contact with the circulating oil and containing an expansible liquid subjected by conduction to the heat of the manifold and of the circulating oil, a normally open grounding switch contained in the ignition circuit and opposing the diaphragm, said switch being adapted to be closed by the expanded diaphragm upon the oil failing to circulate through the casing.

8. In a thermostatically controlled ignition cut-out for the lubricating systems of internal combustion engines, the combination with the exhaust manifold, the ignition circuit and the lubricating system, of a casing suspended from the exhaust manifold but insulated therefrom and through which oil from the circulating system is normally circulating, a stem extending within the diaphragm and subjected by conduction to the heat of the exhaust, said stem having the end thereof remote from the exhaust provided with an open centre, an expansible diaphragm carried by the latter end of the stem and having the interior thereof communicating with the opening in the stem, an expansible liquid within the diaphragm and a normally open grounding switch carried by the casing and opposing the diaphragm and contained in the ignition circuit, said diaphragm being adapted to close the switch and ground the ignition circuit upon an abnormal reduction in the flow of oil through the casing.

Signed at Winnipeg this 22nd day of May, 1926.

CHARLES ROGER RAMSDEN.